(12) United States Patent
Chang (10) Patent No.: US 7,102,819 B2
(45) Date of Patent: Sep. 5, 2006

(54) PROJECTION OPTICS APPARATUS AND THEREOF DISPLAY DEVICE AND THEREOF MANUFACTURING METHOD

(75) Inventor: Sean Chang, Taoyuan (TW)

(73) Assignee: Delta Electronics, Inc., (TW)

( * ) Notice: Subject to any disclaimer, the term of this patent is extended or adjusted under 35 U.S.C. 154(b) by 66 days.

(21) Appl. No.: 10/828,080

(22) Filed: Apr. 19, 2004

(65) Prior Publication Data

US 2004/0212880 A1 Oct. 28, 2004

(30) Foreign Application Priority Data

| Apr. 24, 2003 | (TW) | ................ 92109539 A |
| May 30, 2003 | (TW) | ................ 92114645 A |
| Oct. 23, 2003 | (TW) | ................ 92129420 A |

(51) Int. Cl.
G03B 21/56 (2006.01)
G03B 21/60 (2006.01)

(52) U.S. Cl. ............ 359/456; 359/460; 359/900

(58) Field of Classification Search ........... 359/443, 359/454–456, 460, 900
See application file for complete search history.

(56) References Cited

U.S. PATENT DOCUMENTS

| 5,870,224 | A  | * | 2/1999 | Saitoh et al. | ............. 359/456 |
| 6,256,145 | B1 |   | 7/2001 | Kono et al. | ............. 359/457 |
| 6,384,970 | B1 |   | 5/2002 | Abe et al. | ............. 359/455 |
| 6,700,702 | B1 | * | 3/2004 | Sales | ............. 359/443 |
| 6,728,031 | B1 | * | 4/2004 | Hirata et al. | ............. 359/457 |
| 6,785,048 | B1 | * | 8/2004 | Yamaguchi et al. | ....... 359/453 |
| 2004/0080821 | A1 | * | 4/2004 | Yamaguchi et al. | ....... 359/453 |
| 2004/0196552 | A1 | * | 10/2004 | Hirata et al. | ............. 359/457 |
| 2005/0117212 | A1 | * | 6/2005 | Kumagai et al. | ......... 359/457 |

* cited by examiner

Primary Examiner—W. B. Perkey
Assistant Examiner—Magda Cruz
(74) Attorney, Agent, or Firm—Martine Penilla & Gencarella, LLP (57) ABSTRACT

An optical projection display member includes an optical focusing structure, an optical panel, and a light-absorbing layer. The optical focusing structure has a plurality of micro-optical focusing components. The light-absorbing layer is located between the optical focusing structure and the optics panel. The light-absorbing layer has a plurality of optical transmitting windows corresponding with the micro-optical focusing components. The optical transmitting windows are formed by an optical exposure-developing step.

10 Claims, 14 Drawing Sheets

PROJECTION OPTICS APPARATUS AND THEREOF DISPLAY DEVICE AND THEREOF MANUFACTURING METHOD

BACKGROUND OF THE INVENTION (a) Field of the Invention

The invention relates to an optical projection device, an optical projection display member and a manufacturing method thereof. More particularly, the invention relates to an optical projection device having high contrast, an optical projection display member and a manufacturing method thereof.

(b) Description of the Related Art

Current displays are developed towards trends as being light in weight while having large sizes. Accompanied with these trends, since projection displays have advantages of having small thickness and large sizes, projection displays are gradually replacing conventional televisions to become one of the predominant monitor products. Among various types of projection displays, back-projection displays are considered the most significant.

Monitors of present back-projection displays have the following main functional requirements:

(1) capability of expanding visible range for enlarging viewing angles of the monitors; and (2) protective function over monitors for preventing effects that environment dust and humidity have on internal components of the monitors;

(3) capability of controlling reflections of external stray lights for elevating contrast of the monitors.

Existing techniques for manufacturing monitors are indeed competent as easily achieving the requirements (1) and (2). However, these existing monitors yet fail to perform satisfactory outcomes while both accomplishing the requirement (3) as well as maintaining relatively higher effective light transmissivity.

Figure 1:
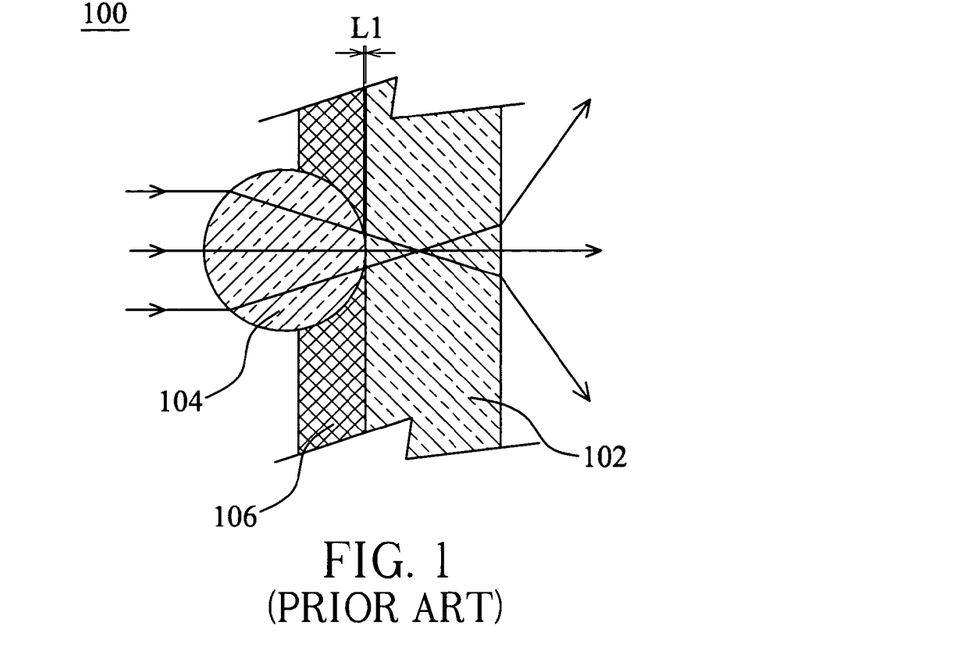
FIG. 1 is a partial schematic view showing a prior display monitor.
Figure 2:
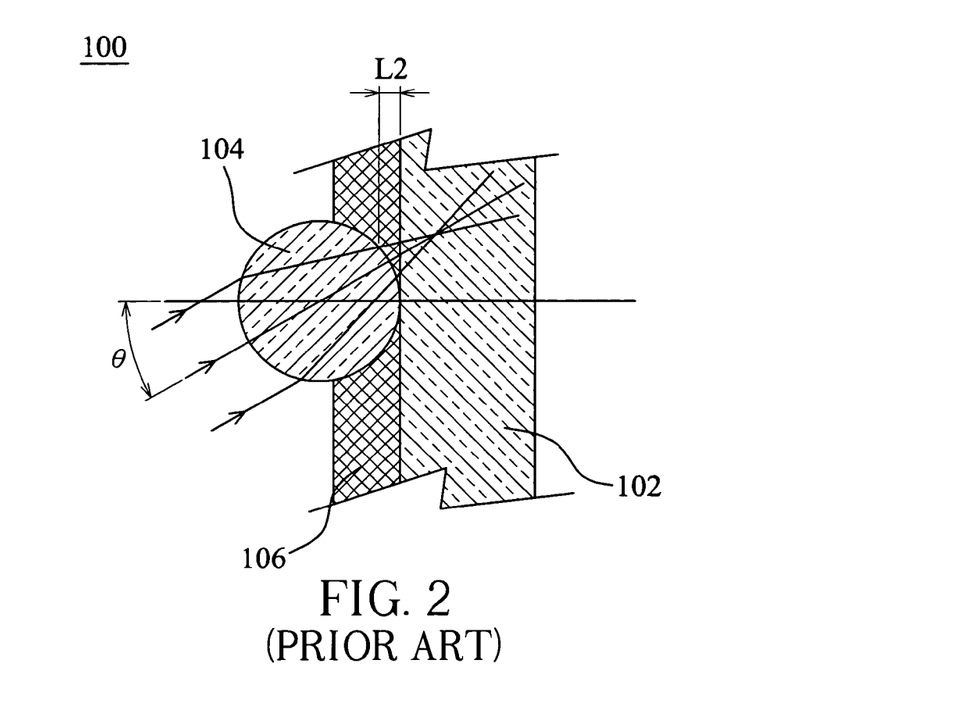
FIG. 2 is a schematic view illustrating light beams incident at an angle $\theta$ into the display monitor in FIG. 1.

Conventional monitors of back-projection display type are generally made by the method as disclosed in U.S. Pat. No. 2,378,252. Referring to FIGS. 1 and 2, a monitor 100 according to this prior technique has a light-absorbing substance layer 106 formed between an optical panel 102 and an optical sphere 104. Using the light-absorbing substance layer 106, external stray lights are absorbed and thus preventing reflections of the stray lights. Also, using the optical sphere 104 and the optical panel 102 to expand an angle of a light beam, so as to broaden the viewing angle.

Figure 3:
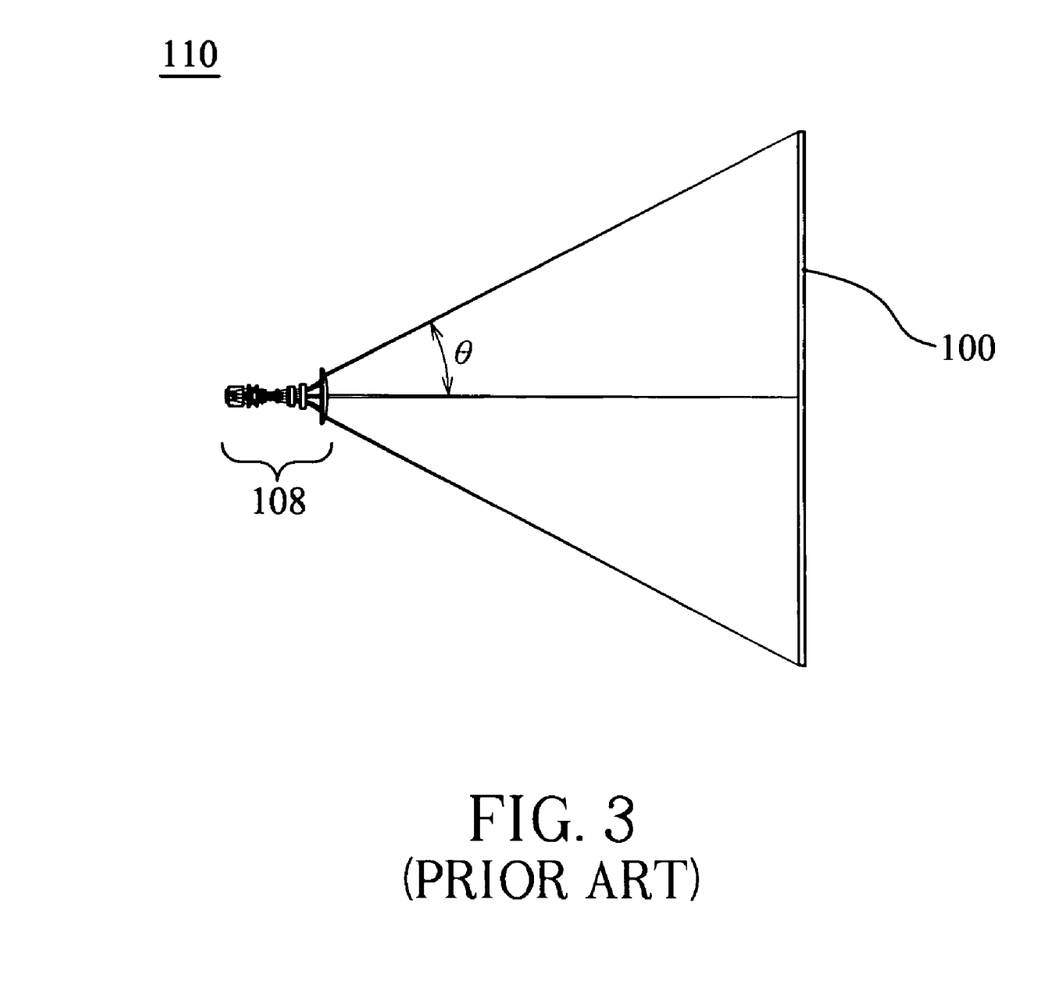
FIG. 3 is a schematic view showing a conventional optical projection device.

However, this prior technique has inherent restrictions as described below. A Light beam incident from the back at a right angle, as shown in FIG. 1, it can easily penetrate through the entire screen. In addition, the light beam incident at an included angle θ, as shown in FIG. 2, it is prone to be absorbed by the light-absorbing substance layer 106, thereby lowering transmissivity thereof. It is observed from FIGS. 1 and 2 that, as the larger the incident angle θ of the light beam gets, a thickness of the light-absorbing layer 106 is increased from L1 to L2. Hence, efficiency of the entire monitor 100 is significantly lowered, or even homogeneity of the monitor 100 is also affected. Referring to FIG. 3, considering available techniques, an angle θ of a light beam incident to an optical projection assembly 108 can vary as high as from 20 to 30 degrees. Therefore, the difficulty as described above shall not be neglected.

SUMMARY OF THE INVENTION

To solve the issue, the invention provides an optical projection display member for simultaneously elevating contrast and display efficiency thereof.

The invention also provides an optical projection display member for substantially lowering production costs and time thereof.

The invention further provides an optical projection device for enlarging the display size as well as elevating contrast and display efficiency at the same time.

An optical projection display member in accordance with the invention includes an optical focusing structure, an optical panel and a light-absorbing layer. The optical focusing structure has a plurality of micro-optical focusing components. The light-absorbing layer is located between the optical focusing structure and the optical panel, and has a plurality of optical transmitting windows. The optical transmitting windows are corresponding to the micro-optical focusing components, and are formed by an exposure developing method.

Another optical projection display member in accordance with the invention includes an optical focusing structure and a light-absorbing layer. The optical focusing structure has a plurality of micro-optical focusing components. The light-absorbing layer is located near focal points of the optical focusing structure, and has a plurality of optical diffusion reflection windows. The optical diffusion reflection windows are corresponding to the micro-optical focusing components, and are formed by an exposure developing method.

Moreover, in the optical projection display member in accordance with the invention, an optical diffusion transmissive substance layer may also be formed between the optical focusing structure and the light-absorbing layer.

In the optical projection display member in accordance with the invention, the method for forming the optical transmitting windows or the optical diffusion reflection windows is an exposure developing method. In addition, positions of the optical transmitting windows or the optical diffusion reflection windows are varied based on positions of light-spots focused by the light beam incident to the optical focusing structure. In addition, shapes of the optical transmitting windows or the optical diffusion reflection windows are corresponding to those of optical paths of the light beam being focused by the optical focusing structure.

The invention also provides an optical projection device including an optical projection assembly and an optical projection display member. The optical projection display member has an optical focusing structure, an optical panel and a light-absorbing layer. The optical projection assembly is for providing optical image light beams. The optical projection display member is for receiving the optical image light beams incident from the optical projection assembly. The optical focusing structure has a plurality of micro-optical focusing components. The light-absorbing layer is located between the optical focusing structure and the optical panel, and has a plurality of optical transmitting windows. The optical transmitting windows are corresponding to the micro-optical focusing components, and are formed by an exposure developing method.

Furthermore, the invention provides yet another optical projection device including an optical projection assembly and an optical projection display member. The optical projection display member has an optical focusing structure and a light-absorbing layer. The optical projection assembly is for providing optical image light beams. The optical projection display member is for receiving the optical image light beams incident from the optical projection assembly. The optical focusing structure has a plurality of micro-optical focusing components. The light-absorbing layer is located near focal points of the optical focusing structure, and has a plurality of optical diffusion reflection windows. The optical diffusion reflection windows are corresponding to the micro-optical focusing components, and are formed by an exposure developing method.

In the optical projection display member in accordance with the invention, the method for forming the optical transmitting windows or the optical diffusion reflection windows is an exposure developing method. In addition, positions of the optical transmitting windows or the optical diffusion reflection windows are varied based on positions of the light-spots focused from the light beams incident to the optical focusing structure. In addition, shapes of the optical transmitting windows or the optical diffusion reflection windows are corresponding to those of optical paths of the light beam being focused by the optical focusing structure.

The optical projection display member in accordance with the invention further includes an ultra-thin magnifying lens, wherein the ultra-thin magnifying glass can be of a hologram type or a Fresnel lens type.

The invention also provides a method for manufacturing an optical projection display member. First of all, an optical focusing structure is provided, which is formed with a plurality of micro-optical focusing components therein. A photosensitive material layer is formed on the optical focusing structure. Next, an exposure-developing step is performed for forming a plurality of patterns having shapes of optical windows in the photosensitive material layer. Portions of the photosensitive material layer are removed, so as to form a plurality of pattern blocks having shapes of optical windows in the photosensitive material layer.

In the method for manufacturing an optical projection display member in accordance with the invention, the photosensitive material layer is formed by applying photoresist. Also, in the method for manufacturing an optical projection display member in accordance with the invention, the material layer may also be formed in the pattern blocks, or even an optical panel may be formed on the material layer and the photosensitive material layer. When the photosensitive material layer includes a light-absorbing substance, the material layer is an optical transmissive substance layer or an optical diffusion reflection substance layer.

In the method for manufacturing an optical projection display member in accordance with the invention, after forming a material layer in the pattern blocks, the photosensitive material layer may be removed, so as to form another material layer at the removed portions, or even an optical panel may be formed on the material layer.

Moreover, in the method for manufacturing an optical projection display member in accordance with the invention, the exposure developing step is able to provide an exposure light source at a predetermined position for a light source, and the exposure light beam from the light source is focused at the photosensitive material layer by the optical focusing structure. Wherein, the photoresist used in the photosensitive material layer is a positive photoresist or a negative photoresist. In addition, a method of removing portions of the photosensitive material layer is to remove the exposed photosensitive material layer or the unexposed photosensitive material layer.

Conclusive from the above, in the optical projection display member in accordance with the invention, the optical transmitting windows and optical diffusion reflection windows are formed by an optical exposure method, and the exposure light source is located at a predetermined position for a light source of the optical projection display member, therefore shapes and positions of the optical transmitting windows are corresponding to optical paths of focused light beams from light beams emitted by the predetermined light source and passed through the optical focusing structure as well. Consequently, unnecessary loss of light beams incident from the predetermined light source is prevented, thereby substantially elevating display efficiency of the optical projection display member.

Moreover, because of the light-absorbing substance layer formed at predetermined non-transmissive areas, external stray light beams or stray light beams in the optical projection assembly are effectively absorbed. Also, external incident light beams are deviated to the light-absorbing substance layer when incident to the optical projection display member due to refractive indices, thereby significantly elevating the contrast.

In the optical projection display member in accordance with the invention, the optical transmitting windows or optical diffusion reflection windows are easily positioned using simple principles of optical exposure developing, and therefore production expenses and time are considerably reduced.

In the optical projection display member in accordance with the invention, shapes and sizes of the optical transmitting windows or optical diffusion reflection windows are automatically adjusted with variance in angles of incident light beams. As a result, when a display size of the optical projection display member is enlarged, the optical transmitting windows or the optical diffusion reflection window are still located at optimum transmitting or reflecting positions, and areas of the openings of the optical transmitting windows or the optical diffusion reflection device are also maintained at smallest sizes possible.

In addition, the optical projection device in accordance with the invention utilizes the optical projection display member as a display monitor thereof, and so optimum contrast and display efficiency are acquired while enlarging the display size thereof.

DETAILED DESCRIPTION OF THE PREFERRED EMBODIMENTS

To better understand the above and other objects, advantages, and features of the invention, preferred embodiments of the invention will be described in detail with reference to the accompanying drawings.

Figure 4:
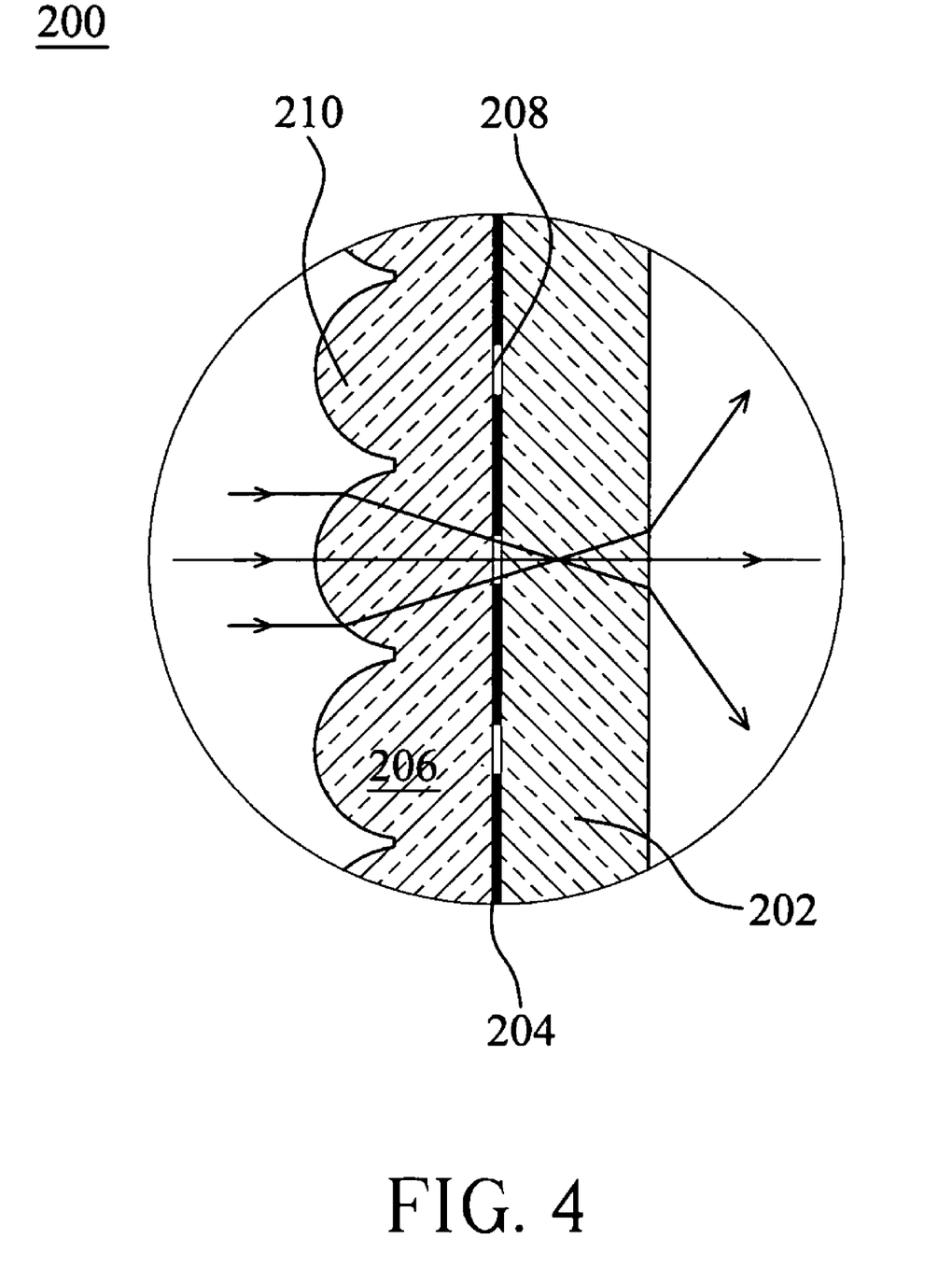
FIG. 4 is a partial schematic view illustrating the display member of the invention.

Referring to FIG. 4, a display member 200 in accordance with the invention includes an optical focusing structure 206, an optical panel 202, and a light-absorbing substance layer 204 having optical transmitting windows 208. The optical transmitting windows 208 are formed by an exposure developing method.

The optical panel 202 is for scattering light beams incident from one side thereof to the other side thereof. The principle behind the above is that, there exists a difference in refractive indices of the optical panel 202 and external air medium, such that a larger scattering angle is produced when the light beams are sent out via the surface of the optical panel 202, thereby obtaining effects of broadened-viewing angles.

The optical focusing structure 206 has a plurality of micro-optical focusing components 210. Each of the micro-optical focusing components 210 focuses light beams incident from one side to a corresponding side, so as to focus incident light beams to a same focal point.

The light-absorbing substance layer 204 is located between the optical panel 202 and the optical focusing structure 206, for absorbing unnecessary stray light beams. In addition, the light-absorbing substance layer 204 has a plurality of optical transmitting windows 208 at an interior thereof. Positions of the optical transmitting windows 208 are corresponding to focal points of the micro-optical focusing components 210, and the optical transmitting windows 208 are made by a material such as an air medium, an optical diffusion transmissive substance, or an optical transmissive substance. Furthermore, the optical transmitting windows 208 are formed by an exposure developing method such as an optical exposure developing method.

Figure 5A:
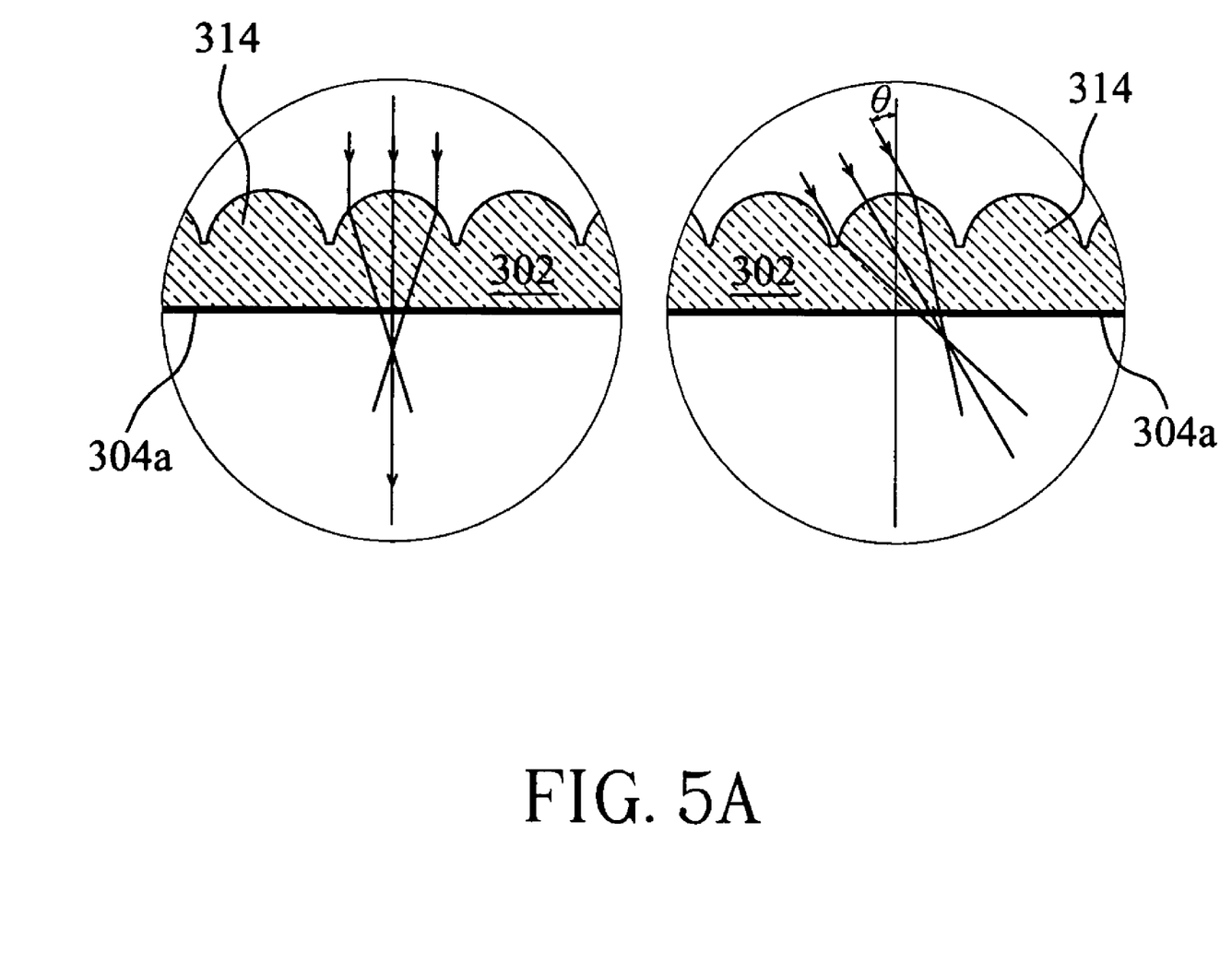
FIGS. 5A to 5C are schematic views illustrating the process for manufacturing the display member in a first preferred embodiment of the invention.

A method for manufacturing a display member 300 in accordance with a first preferred embodiment of the invention will be described below. Referring to FIG. 5A, an optical focusing device 302 having a plurality of micro-optical focusing components 314 is provided. A photosensitive material layer 304a is formed on the optical focusing structure 302, and the photosensitive material layer 304a contains a light-absorbing substance. The photosensitive material layer 304a is made by a material like a positive photosensitive material, a negative photosensitive material, or any photoresist containing either of the photosensitive materials.

Figure 6:
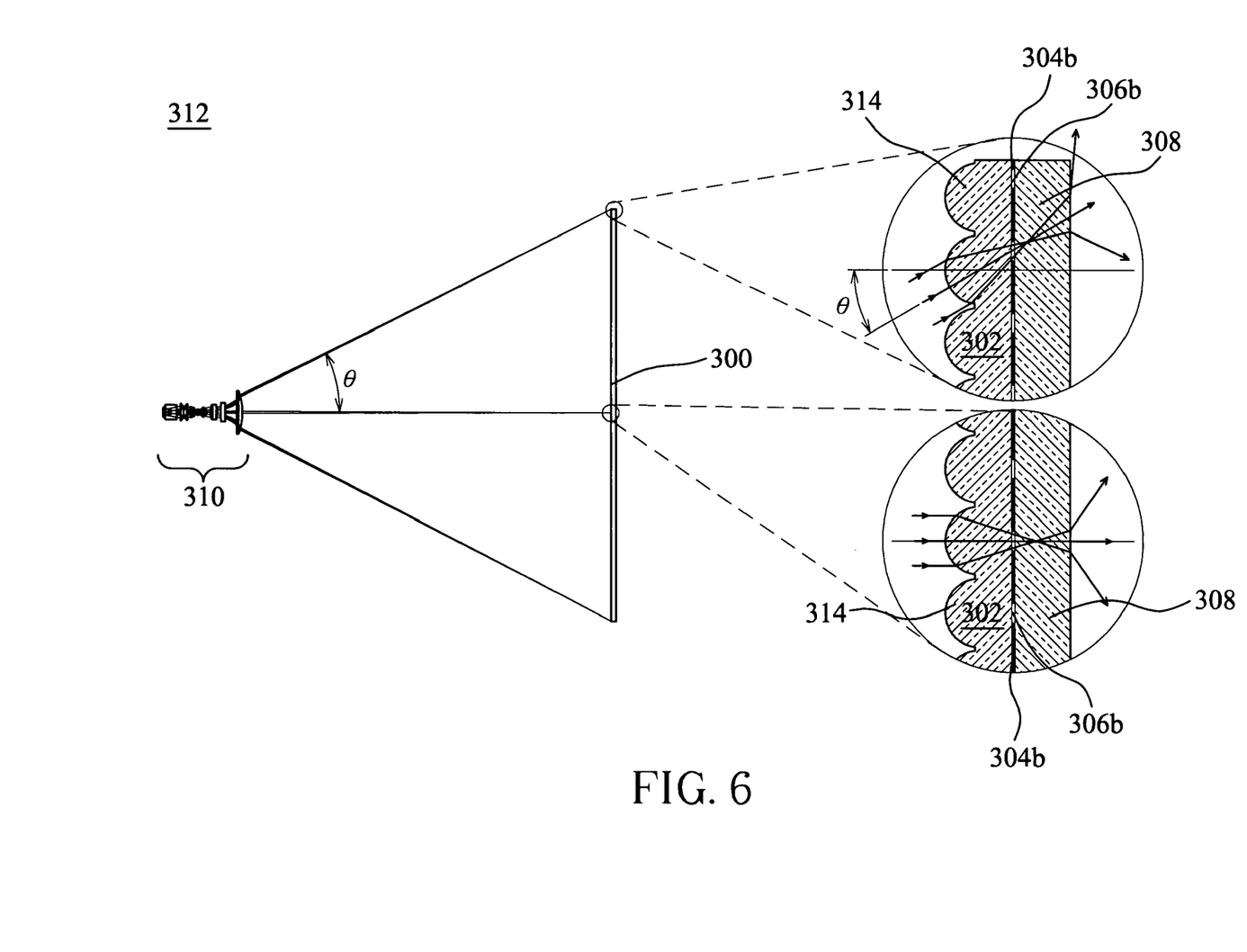
FIG. 6 is a schematic view showing the optical projection device in a preferred embodiment of the invention.

An exposure light source (not shown) is disposed in a predetermined position that a light source is to be disposed (approximately a position of an optical projection assembly 310 shown in FIG. 6). The exposure light source may be an ultra-violet (UV) light source. The light-emitting type of the exposure light source is identical to that of the optical projection assembly 310.

The exposure light source is activated to emit light beams (as indicated by arrows in FIG. 5A), which is then incident to the optical focusing structure 302 at an incident angle θ. A focusing spot is formed at the photosensitive material layer 304a by the focusing effect of the micro-optical focusing components 314 on the photosensitive material layer 304a. Thus, portions of the photosensitive material layer 304a that were passed through by the focused light beams are exposed. In addition, shapes of these portions are corresponding to optical paths of the exposure light source.

Figure 5B:
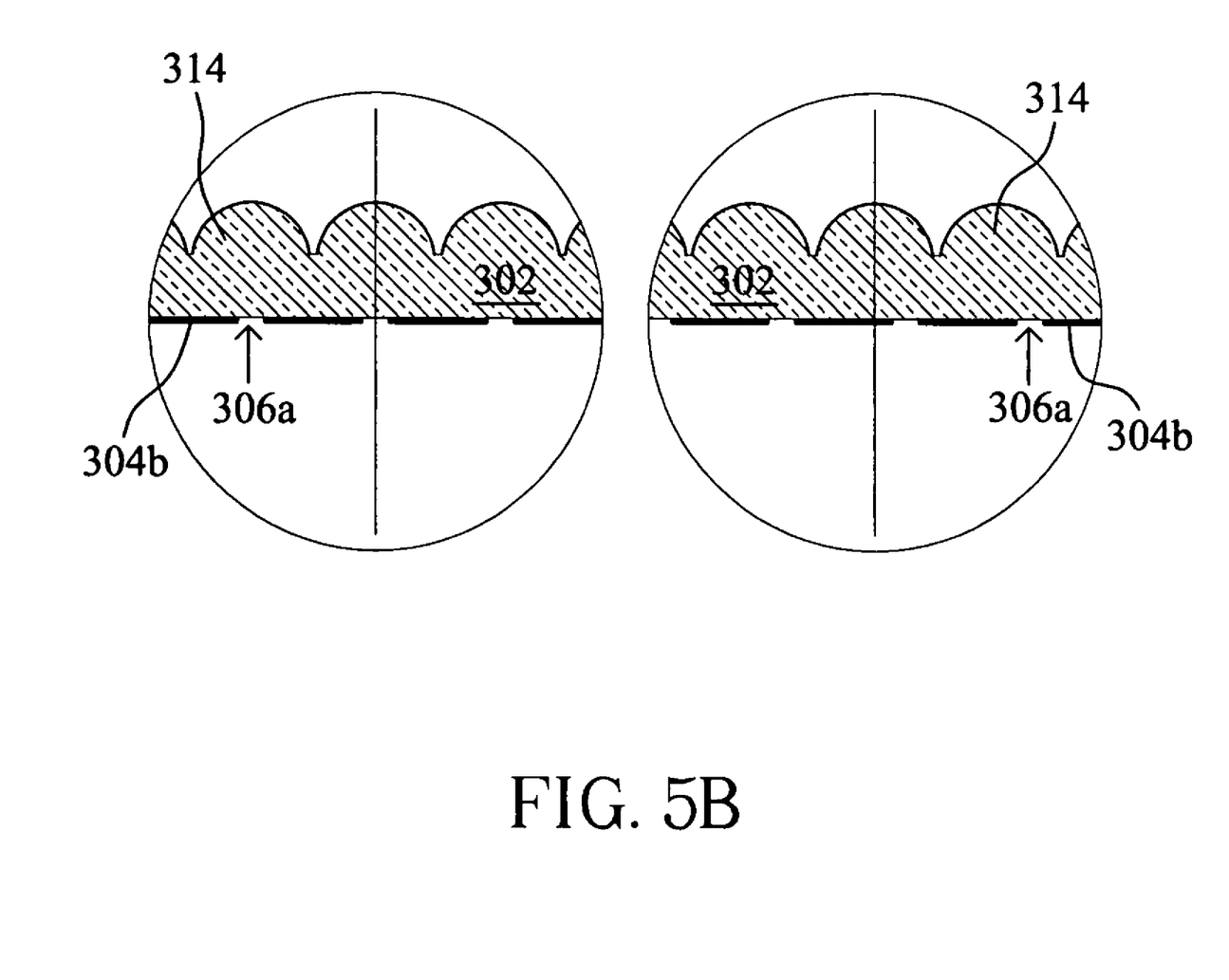

Referring to FIG. 5B, exposed portions of the photosensitive material layer 304a are removed so as to form a photosensitive material layer having a plurality of openings 306a. The photosensitive material layer functions as a light-absorbing substance layer 304b.

Figure 5C:
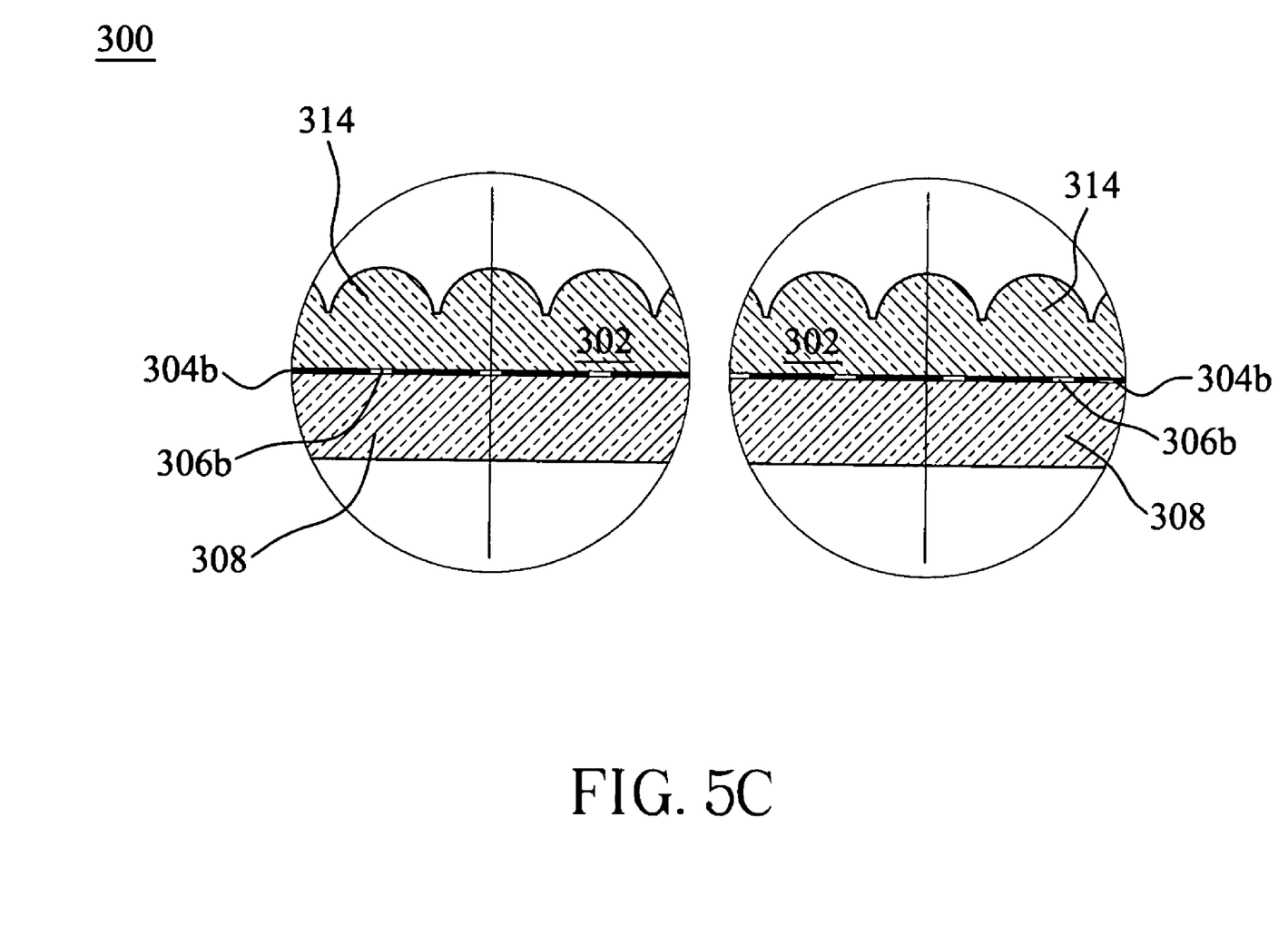

Referring to FIG. 5C, an optical transmissive substance layer is formed in the openings 306a as optical transmitting windows 306b. Moreover, the optical transmitting windows 306b may also be directly formed by an air medium. Next, an optical panel 308 is formed on the optical transmitting windows 306b and the light-absorbing substance layer 304b, thereby completing the manufacturing of the display member 300.

Referring to FIG. 6, an optical projection device 312 of the invention is obtained by assembling the display member 300 and the optical projection assembly 310 of the invention. The optical projection assembly 310 provides image light beams required by the optical projection device 312. The optical projection assembly 310 includes, for instance, a projection lens and a light valve for producing images. The light valve produces images, and the image light beams are then projected to the display member 300 via the projection lens. The image light beams are incident to the display member 300 at a conical angle. In addition, the optical projection assembly 310 may also be consisted of only a light valve that produces image light beams. The display member 300 receives the light beams within a range of the conical angle, and displays optical information contained by the light beams.

During the manufacturing process of the optical transmitting windows 306a in accordance with the invention, patterning effects are acquired owing to the light beams emitted from the exposure light source located in the optical projection assembly 310. The light-emitting type of the exposure light source is similar to that of the light source used in the optical projection assembly 310, and an emitting angle thereof is also similar to that of the optical projection assembly 310. Hence, the optical paths of the light beams emitted by the exposure light source are similar to those of the optical projection assembly 310. Therefore, shapes of the optical transmitting windows 304b are corresponding to those of the optical paths of the light source in the optical projection assembly 310.

In a preferred embodiment of the invention, the exposure light source is used, and an area of the exposure light source is approximately equal to an effective area of the light valve. In addition, the position of the exposure light source also approximates a position of the light valve. Another projection lens is utilized so as to enlarge the exposure light source to an original magnification when using the light valve. In this way, exposure light beams incident to individual positions of the display member 300 approximate the image light beams when using the light valve. Hence, positions and sizes of the optical transmitting windows 304b formed by the exposure light source are equal to positions and sizes required by the image light beams when using the light valve.

In addition, positions of the optical transmitting windows 304b are automatically adjusted according to variance in angles of incident light beams. Consequently, minimal areas of the windows are still maintained while providing the focused light beams with largest transmissivity effects.

Conclusive from the above, positions and shapes of the optical transmitting windows in the display member are optimum, and thus the projection device using this display member can simultaneously have best contrast and display efficiency.

FIGS. 7A to 7E show schematic views illustrating the manufacturing process of the display member in a second preferred embodiment of the invention.

Figure 7A:
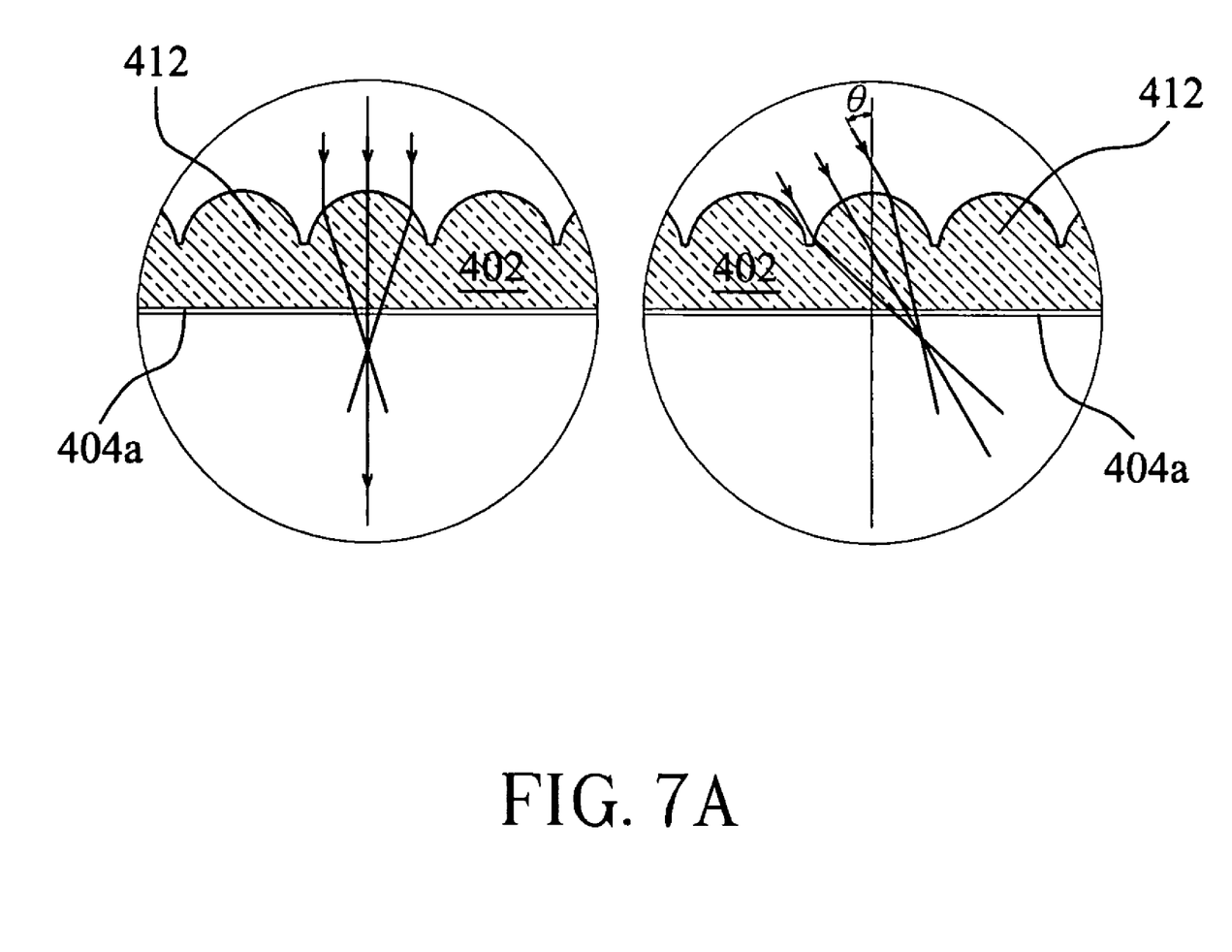
FIGS. 7A to 7E are schematic views illustrating the process for manufacturing the display member in a second preferred embodiment of the invention.

Referring to FIG. 7A, an optical focusing device 402 having a plurality of micro-optical focusing components 412 is provided. A photosensitive material layer 404a is formed on the optical focusing structure 402, wherein the photosensitive material layer 404a is made of a material such as a positive photosensitive material or a negative photosensitive material.

A predetermined position for a light source (approximately the position of the optical projection assembly 310 shown in FIG. 6) is disposed with an exposure light source (not shown), which may be an UV light source. The light-emitting type of the exposure light source is identical to that of the optical projection assembly 310, and can be a point light source, a line light source or a plane light source, for example.

The exposure light source is activated to emit light beams (as indicated by arrows in FIG. 7A), which is then incident to the optical focusing structure 402 at an incident angle θ. A focusing spot is formed at the photosensitive material layer 404a using focusing effect of the micro-optical focusing components 314 on the photosensitive material layer 404a. Thus, portions of the photosensitive material layer 404a that were passed through by the focused light beams are exposed. In addition, shapes of these portions are corresponding to optical paths of the exposure light source.

Figure 7B:
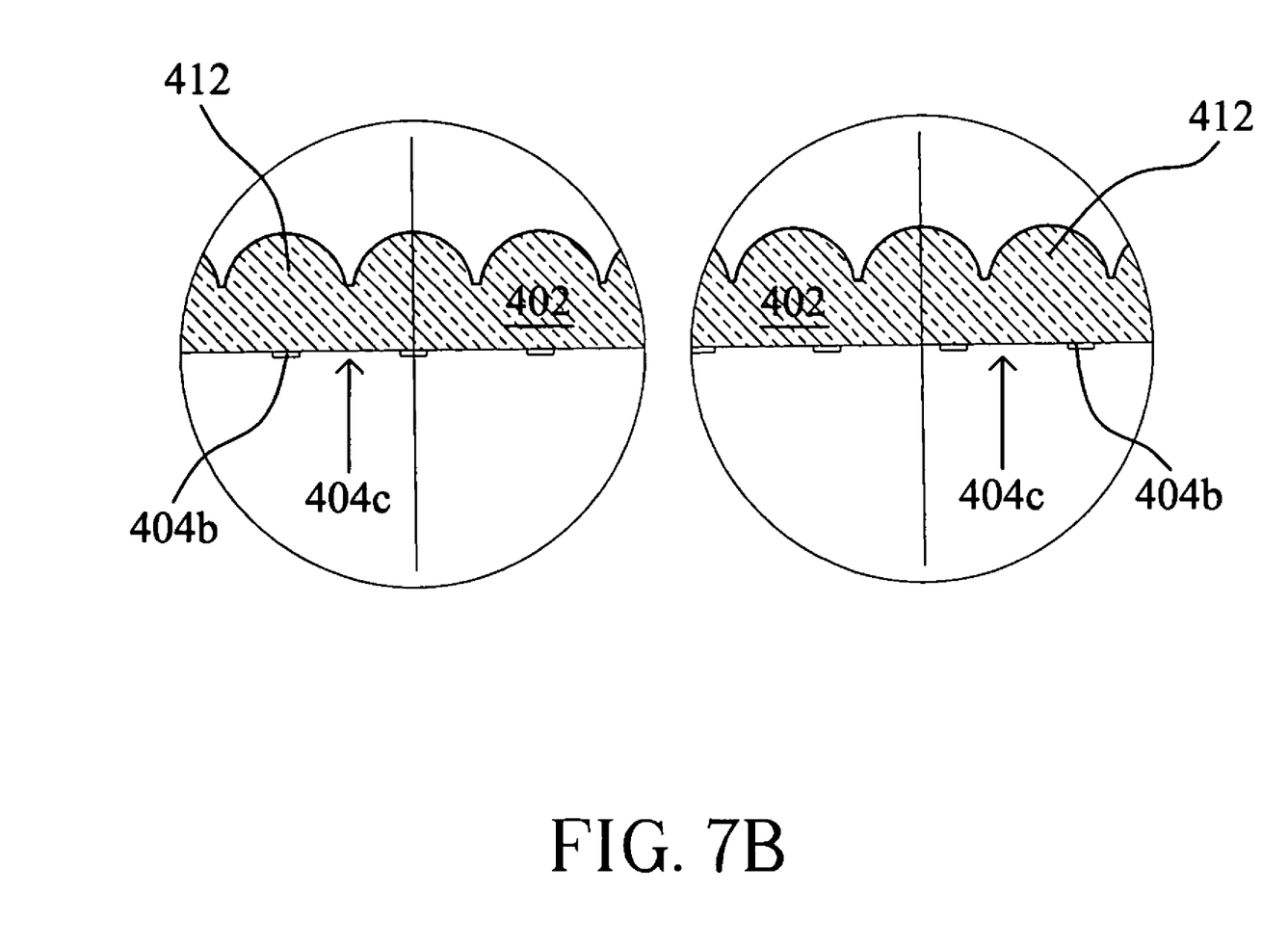
Figure 7C:
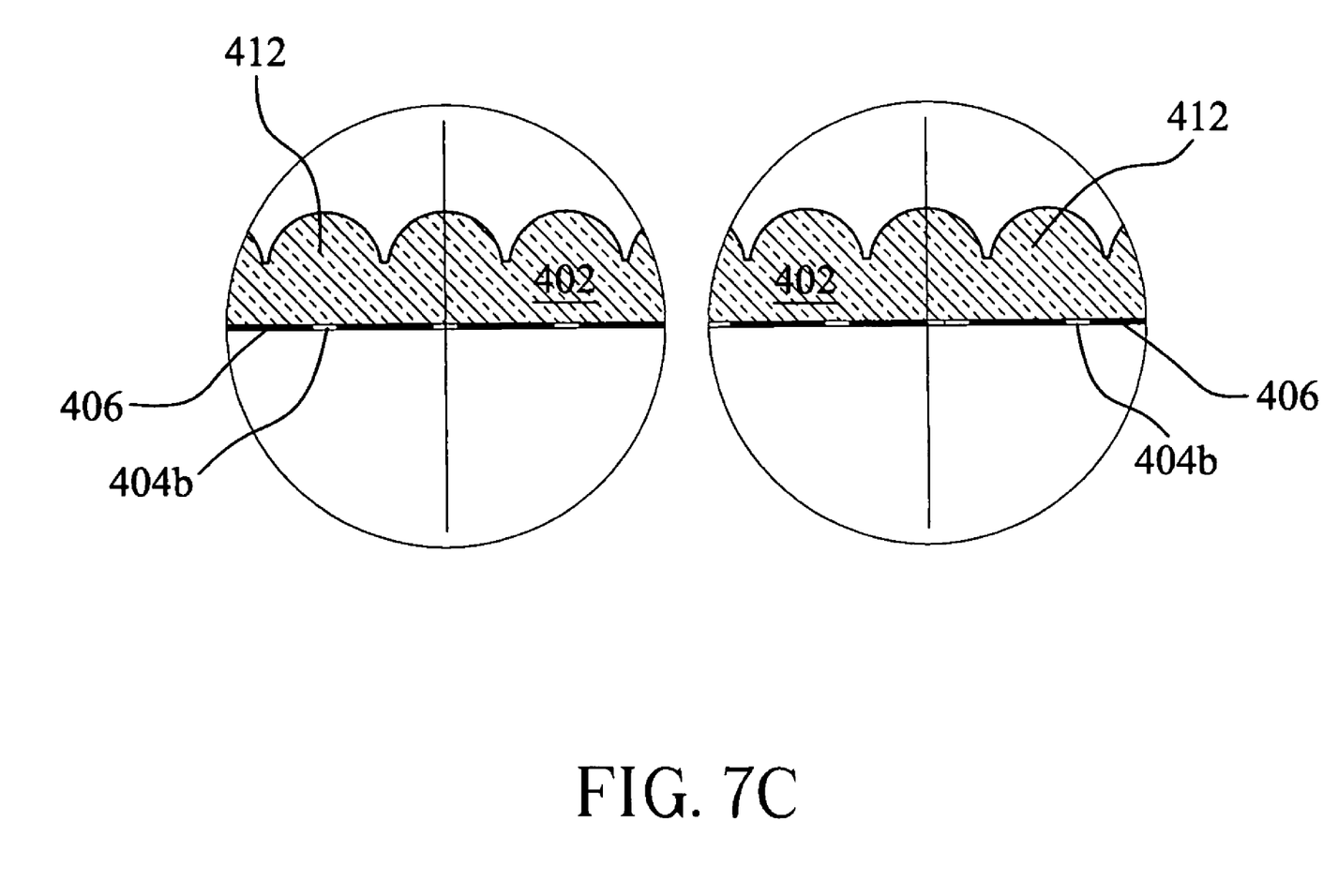

Referring to FIG. 7B, unexposed portions of the photosensitive material layer 404a are removed for forming a photosensitive material layer 404b having exposed areas 404c of the optical focusing structure 402. Referring to FIG. 7C, a photosensitive material layer 406 is formed at the area 404c.

Figure 7D:
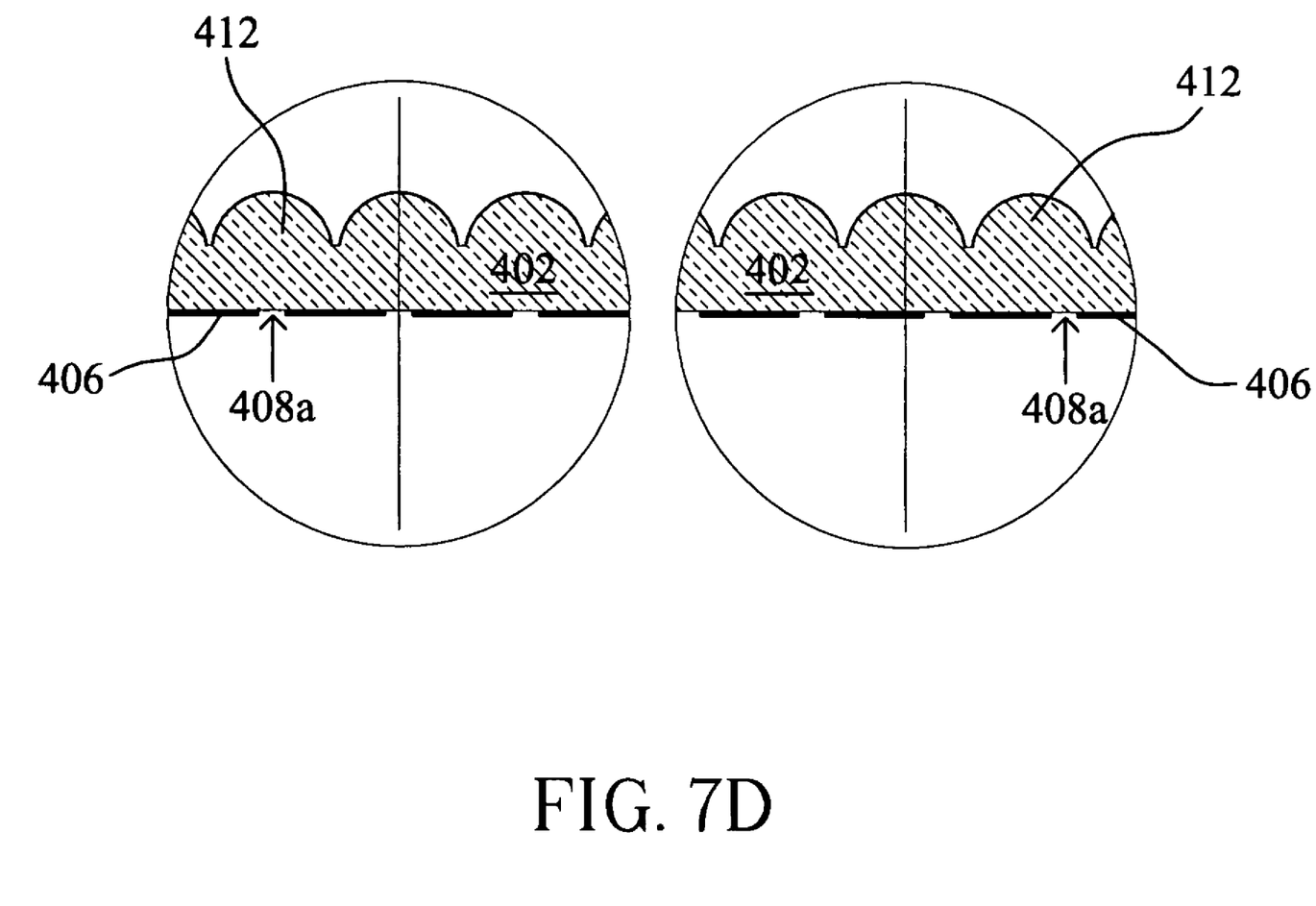
Figure 7E:
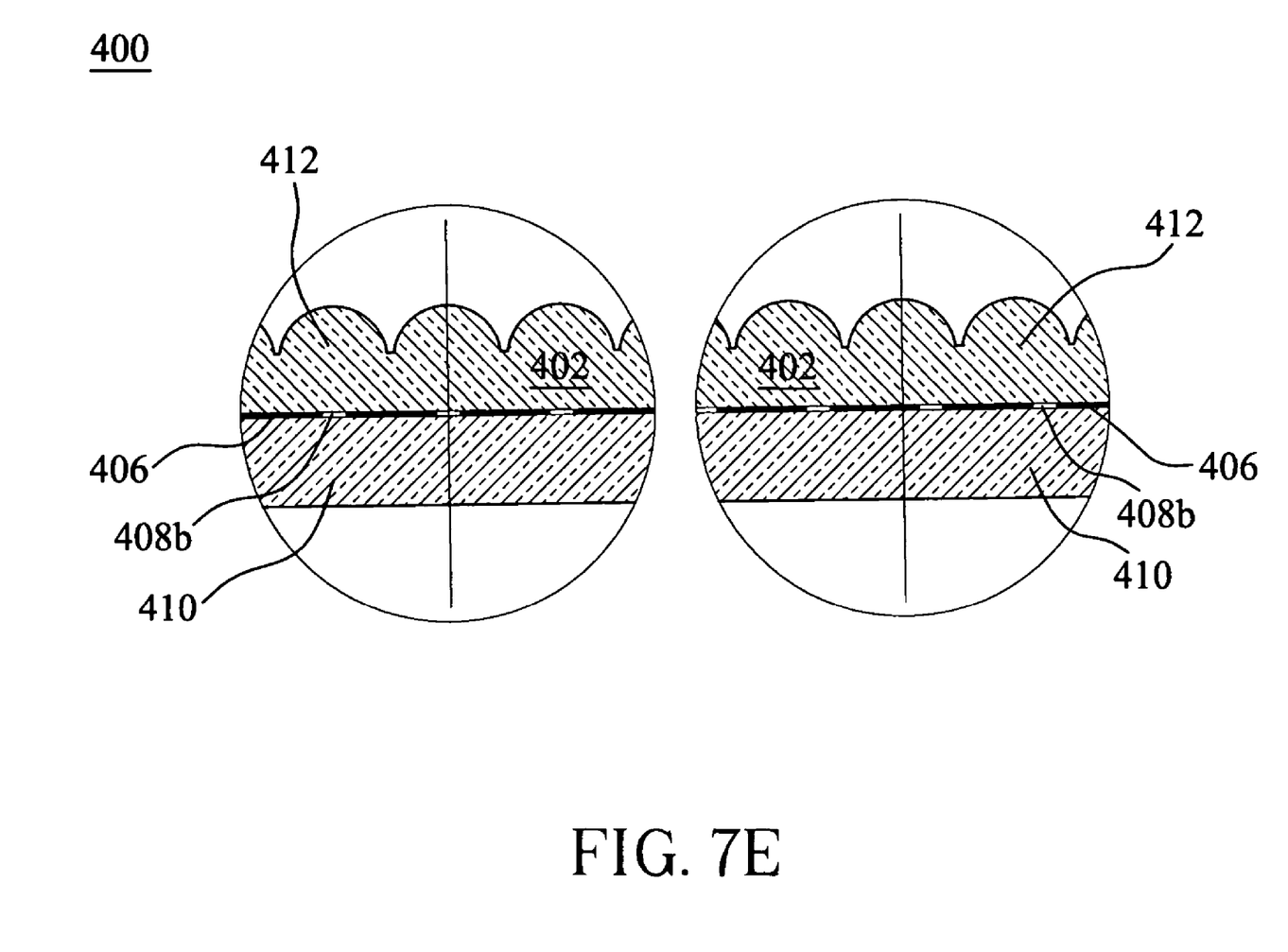

Referring to FIG. 7D, the remaining photosensitive material layer 404b is removed for forming openings 408a. Referring to FIG. 7E, an optical transmissive substance layer for serving as optical transmitting windows 408b is formed in the openings 408a. The optical transmitting windows 408 are made of materials such as optical diffusion transmissive substances or optical transmissive substances. Furthermore, the optical transmitting windows 408 may also be directly formed by an air medium. Next, an optical panel 410 is formed on the optical transmitting windows 408b and a light-absorbing substance layer 406, thereby completing the manufacturing of the display member 400.

When stray light beams are incident to the display members 300 and 400, they are absorbed by the light-absorbing substance layers 304b and 406. Therefore, when images are displayed by the display members 300 and 400, the images have better contrast for not being interfered by the stray light beams.

Figure 8A:
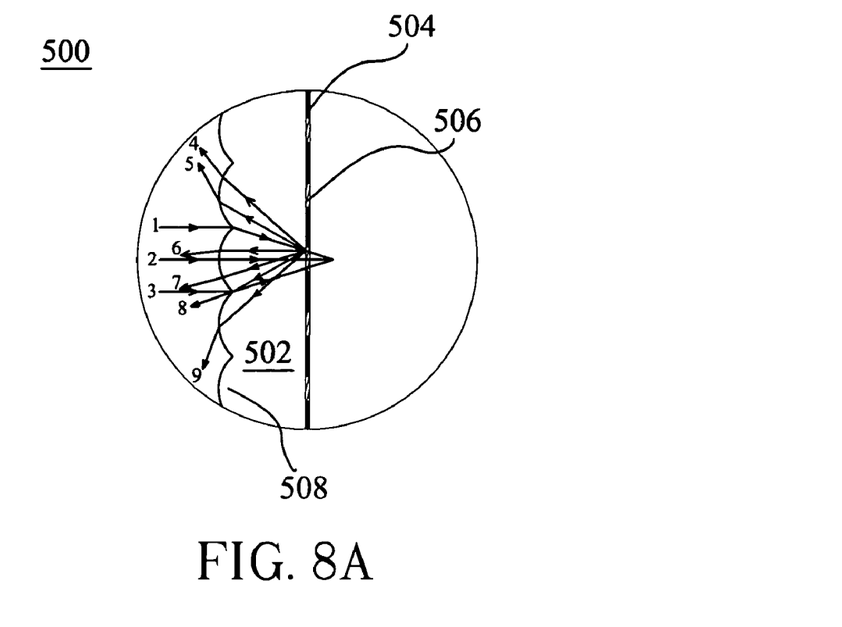
FIG. 8A is a partial schematic view illustrating the display member in a third preferred embodiment of the invention.

Although illustrations of the invention are given using a display member having optical transmitting windows, the invention shall not be limited within. The display member may be replaced by a display member having optical diffusion reflection windows. Referring to FIG. 8A, in a display member 500 in accordance with the invention, an optical diffusion reflection substance layer 506 may also be formed in the openings 306a and 408a after completing the formation of the openings 306a and 408a. A display member 500 in accordance with the invention is then obtained.

In this preferred embodiment, light beams are incident along optical paths 1, 2 and 3 into micro-optical focusing components 508 of an optical focusing structure 502. The optical paths 1, 2 and 3 are then reflected by an optical diffusion reflection substance layer 506, and reach the exterior (optical paths 4, 5, 6, 7, 8 and 9) via the optical focusing structure 502.

Figure 8B:
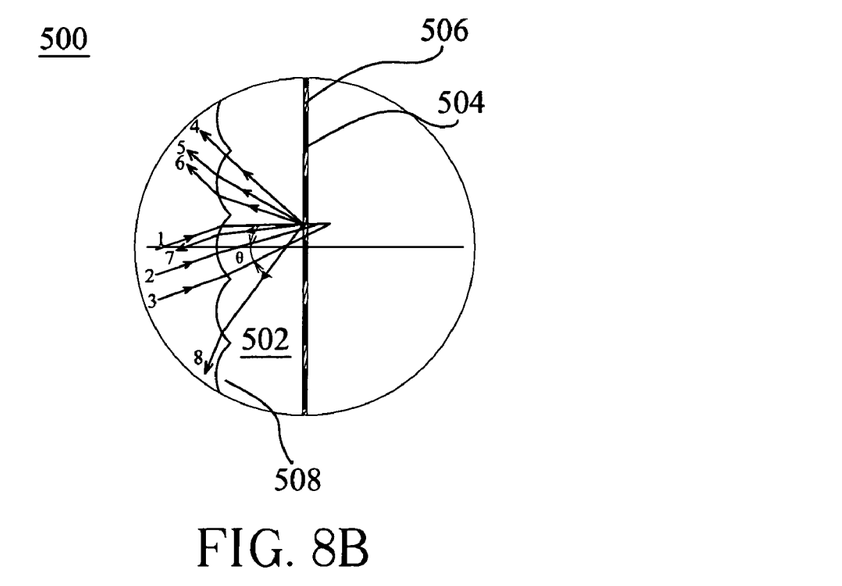
FIG. 8B is a schematic view illustrating light beams incident at an angle $\theta$ into the display member in the third preferred embodiment of the invention.

Referring to FIG. 8B, when the optical paths 1, 2 and 3 are incident to the optical focusing structure 502 at an incident angle θ, for that the position of the optical diffusion reflection substance layer 506 has been automatically adjusted according to variance in angles of incident light beams during the manufacturing process thereof, the optical paths 1, 2 and 3 incident at the incident angle θ are not absorbed by the light-absorbing substance layer 504, thereby maintaining better display efficiency.

Figure 9:
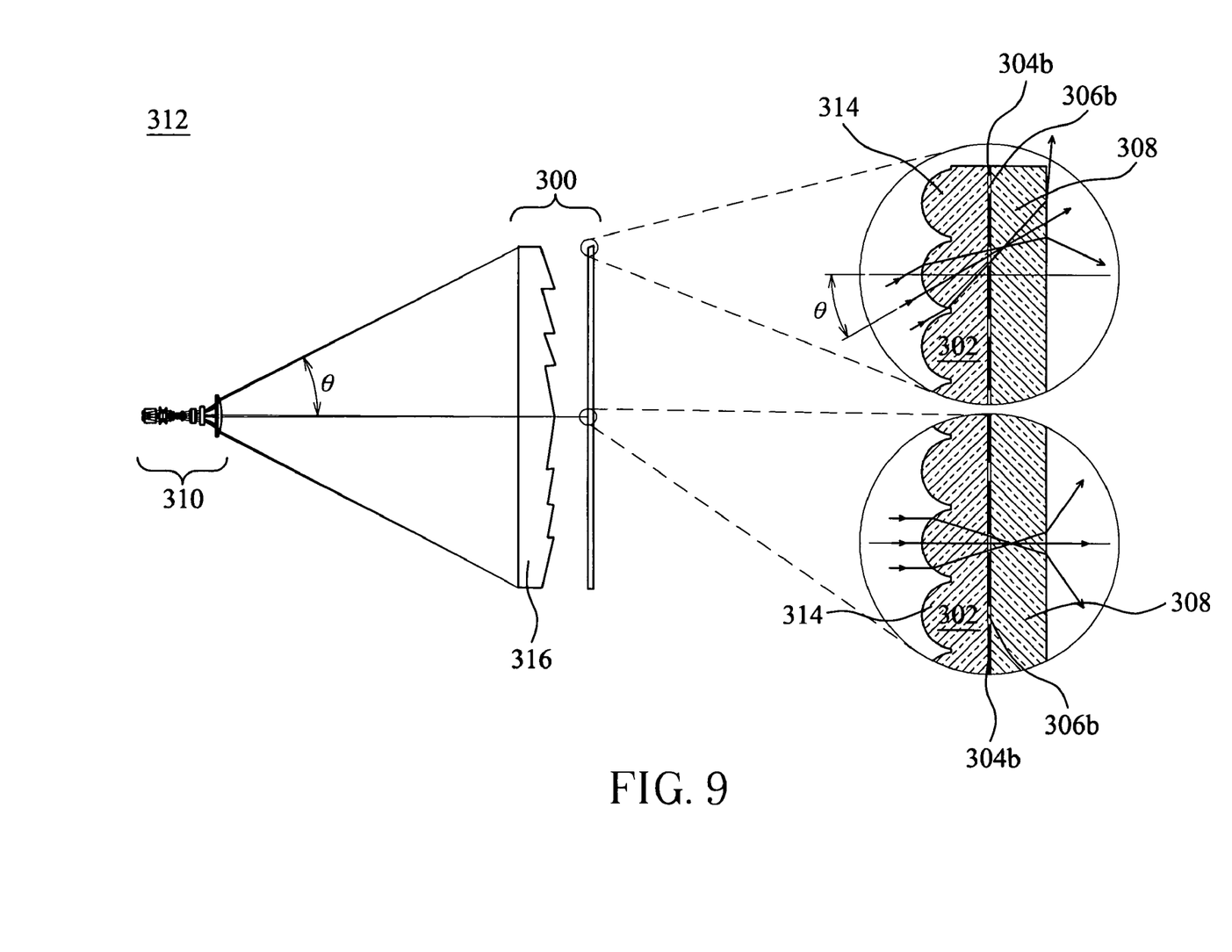
FIG. 9 is a schematic view illustrating another embodiment of the optical projection device in the first preferred embodiment of the invention.

Referring to FIG. 9, the display member 300 in accordance with the invention may also include an ultra-thin magnifying lens 316. The magnifying lens 316 is an optical assembly capable of elevating brightness and homogeneity of projected light beams, and the magnifying lens may be of a hologram type or a Fresnel lens type.

When external stray light beams are incident to the display member 500 in accordance with the invention, the stray light beams are absorbed by the light-absorbing substance layer 504 due to having different incident angles from the predetermined incident angle. As a result, images displayed by the display member 500 are not interfered by external stray light beams and thus have better contrast.

Furthermore, in a display member in accordance with the invention, an optical diffusion transmissive substance layer may also be formed between the optical focusing structure and the optical transmitting windows. The formation of the optical diffusion transmissive substance layer is completed by first applying an optical diffusion transmissive substance layer on the optical focusing structure, and then applying a photoresist layer. The display member in another embodiment of the invention is obtained after forming the optical transmitting windows using the optical exposure developing method. Also, in yet another embodiment, a structure of a display member in may be acquired by forming an optical panel.

Conclusive from the above, in the display member in accordance with the invention, especially the display member having optical transmitting windows or optical diffusion reflection windows thereof formed by an optical exposure method, an exposure light source is located at a predetermined position for a light source of the display member, and hence shapes and positions of the optical transmitting windows are corresponding to optical paths of focused light beams from light beams emitted by the predetermined light source and passed through the optical focusing structure as well. Consequently, unnecessary loss of light beams incident from the predetermined light source is prevented, thereby substantially elevating display efficiency of the display member.

Moreover, because of the light-absorbing substance layer formed at the predetermined non-transmissive areas, external stray light beams or stray light beams in the optical projection assembly are effectively absorbed. Also, external light beams are deviated to the light-absorbing substance layer when incident to the display member due to refractive indices, thereby significantly elevating the contrast.

In the display member in accordance with the invention, the optical transmitting windows or optical diffusion reflection windows thereof are easily positioned using simple principles of optical exposure developing, and therefore production expenses and time are considerably reduced.

In the display member in accordance with the invention, shapes and sizes of the optical transmitting windows or optical diffusion reflection windows thereof are automatically adjusted with variance in angles of incident light beams. As a result, when the display size of the display member is enlarged, the optical transmitting windows or the optical diffusion reflection window are still located at optimum transmitting or reflecting positions, and areas of the openings at the optical transmitting windows or the optical diffusion reflection windows are also maintained at smallest sizes possible.

In addition, the optical projection device in accordance with the invention utilizes the display member as a display monitor thereof, and so optimum contrast and display efficiency are acquired while also enlarging a display size thereof.

While the invention has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the invention.

What is claimed is:

1. A method for manufacturing an optical projection display member comprising:
    providing an optical focusing structure formed with a plurality of micro-optical focusing components;
    forming a photosensitive material layer near focal points of the optical focusing structure;
    performing an optical exposure developing step for forming a plurality of first patterns in the photosensitive material layer; and
    removing portions of the photosensitive material layer for forming a plurality of first pattern blocks in the photosensitive material layer.

2. The method as described in claim 1, wherein the optical exposure developing step comprises the step of:
    forming an exposure light beam using an exposure light source, and projecting the exposure light beam to the photosensitive material layer, wherein an angle of the exposure light beam approximates that of an actual light beam from an image source for optical projection, and wherein the exposure light source is a light source selected from a group consisting of point light source, line light source, and plane light source.

3. The method as described in claim 1, wherein the optical exposure developing step comprises the step of:
    forming a light beam using an exposure light source, and then forming an exposure light beam from the light beam having passed through an exposure projection lens, and projecting the exposure light beam to the photosensitive material layer, wherein an angle of the exposure light beam approximates that of an actual light beam from an image source for optical projection, and wherein the exposure light source is a light source selected from a group consisting of point light source, line light source, and plane light source.

4. The method as described in claim 1, further comprising forming a first material layer in the first pattern blocks.

5. The method as described in claim 4, further comprising:
    removing the photosensitive material layer for forming a plurality of second pattern blocks; and
    forming a second material layer in the second pattern blocks.

6. The method as described in claim 5, further comprising forming an optical panel on the first material layer and the second material layer.

7. The method as described in claim 5, wherein the second material layer is formed by a material selected from a group consisting of a light-absorbing substance, an air medium, an optical diffusion transmissive substance, an optical transmissive substances and an optical diffusion reflection substance;
    when the second material layer includes a light-absorbing substance, the first material layer is formed by a material selected from a group consisting of an air medium, an optical diffusion transmissive substance, an optical transmissive substance, and an optical diffusion reflection substance; and
    when the second material layer is formed by a material selected from a group consisting of an air medium, an optical diffusion transmissive substance, an optical transmissive substance and an optical diffusion reflection substance, the first material layer includes a light-absorbing substance.

8. The method as described in claim 1, further comprising forming an optical panel, and the light-absorbing layer being located between the optical focusing structure and the optical panel.

9. The method as described in claim 1, wherein the photosensitive material layer comprises a light-absorbing substance, and the first material layer are formed by a material selected from a group consisting of an air medium, an optical diffusion transmissive substance, an optical transmissive substance, and an optical diffusion reflection substance.

10. The method as described in claim 1, further comprising:
    before forming the photosensitive material layer, a step for forming an optical diffusion transmissive substance layer on the optical focusing structure, and the optical diffusion transmissive substance layer being located between the photosensitive material layer and the optical focusing structure.

* * * * *